US009967129B1

(12) United States Patent
Katapadi et al.

(10) Patent No.: US 9,967,129 B1
(45) Date of Patent: May 8, 2018

(54) SYSTEM AND METHOD FOR COMMUNICATING CALL INFORMATION IN A SESSIONS INITIATION PROTOCOL (SIP) ENVIRONMENT

(75) Inventors: Umesh P. Katapadi, Raleigh, NC (US); Daniel P. Linton, Apex, NC (US); Craig P. Miller, Raleigh, NC (US); David W. Mills, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 2180 days.

(21) Appl. No.: 11/373,669

(22) Filed: Mar. 9, 2006

(51) Int. Cl.
H04L 29/06 (2006.01)

(52) U.S. Cl.
CPC .. H04L 29/06027 (2013.01); H04L 29/06034 (2013.01); H04L 29/06197 (2013.01)

(58) Field of Classification Search
CPC ......... H04L 29/06027; H04L 29/06034; H04L 29/06197
USPC ........ 370/352–356, 395.52; 379/219, 220.01
See application file for complete search history.

(56) References Cited

U.S. PATENT DOCUMENTS

| | | | |
|---|---|---|---|
| 3,963,874 A | 6/1976 | Pommerening et al. | 179/18 AB |
| 4,809,321 A | 2/1989 | Morganstein et al. | 379/211 |
| 6,501,750 B1 | 12/2002 | Shafer et al. | 370/352 |
| 6,510,162 B1 | 1/2003 | Fijolek et al. | 370/432 |
| 6,546,087 B2 | 4/2003 | Shaffere et al. | 379/90.01 |
| 6,567,505 B1 | 5/2003 | Omori et al. | 379/84 |
| 6,601,099 B1 | 7/2003 | Corneliussen | 709/224 |
| 6,614,899 B1 | 9/2003 | Sollee et al. | 379/218.01 |
| 6,615,236 B2 * | 9/2003 | Donovan et al. | 709/203 |
| 6,625,141 B1 | 9/2003 | Glitho et al. | 370/352 |
| 6,636,594 B1 | 10/2003 | Oran | 379/201.01 |
| 6,658,095 B1 * | 12/2003 | Yoakum et al. | 379/93.01 |
| 6,661,799 B1 | 12/2003 | Molitor | 370/401 |
| 6,665,723 B2 | 12/2003 | Trossen | 709/227 |
| 6,674,746 B1 * | 1/2004 | Lamarque, III | H04L 12/6418 370/352 |

(Continued)

OTHER PUBLICATIONS

H. Schulzrinne et al., "RTP Payload for DTMF Digits, Telephony Tones and Telephony Signals," *The Internet Society*, http://tools.ietf.org/html/rfc2833, May 2000, 29 pages.

(Continued)

*Primary Examiner* — Khaled Kassim
(74) *Attorney, Agent, or Firm* — Baker Botts L.L.P.

(57) ABSTRACT

A method is provided for invoking call features to be executed in a session initiation protocol (SIP) environment, the method comprising: receiving a signal indicating a feature activation; and inserting a call information header into a SIP message, the call information header comprising a parameter that identifies the activated feature. Alternatively or additionally, a method is provided for controlling a user interface coupled to an endpoint in a SIP environment, the method comprising: receiving a SIP message comprising a user interface parameter carried in a call information header; and modifying the user interface to reflect the value of the user interface parameter. In yet another alternative, a method is provided for communicating user interface information to an endpoint in a SIP environment, comprising: creating a SIP message comprising a user interface parameter in a call information header; and transmitting the SIP message to the endpoint.

31 Claims, 3 Drawing Sheets

(56) References Cited

U.S. PATENT DOCUMENTS

| | | | |
|---|---|---|---|
| 6,678,735 | B1 | 1/2004 | Orton et al. .................. 709/230 |
| 6,684,147 | B2 | 1/2004 | Park et al. ...................... 701/71 |
| 6,731,625 | B1* | 5/2004 | Eastep et al. .................. 370/352 |
| 6,738,390 | B1 | 5/2004 | Xu et al. ........................ 370/467 |
| 6,754,181 | B1 | 6/2004 | Elliott et al. .................. 370/252 |
| 6,760,322 | B1 | 7/2004 | Fukuda et al. ................ 370/352 |
| 6,785,246 | B2 | 8/2004 | Foti ................................ 370/261 |
| 6,788,676 | B2 | 9/2004 | Partanen et al. .............. 370/352 |
| 7,382,773 | B2* | 6/2008 | Schoeneberger et al. .... 370/353 |
| 7,554,927 | B2* | 6/2009 | Hanna et al. .................. 370/252 |
| 8,015,305 | B1* | 9/2011 | Linton et al. .................. 709/230 |
| 2003/0058806 | A1* | 3/2003 | Meyerson et al. ............ 370/260 |
| 2006/0007954 | A1 | 1/2006 | Agrawal et al. ............... 370/466 |
| 2006/0171309 | A1* | 8/2006 | Chen et al. .................... 370/229 |
| 2006/0203807 | A1* | 9/2006 | Kouretas et al. .............. 370/352 |
| 2006/0221941 | A1* | 10/2006 | Kishinsky et al. ............ 370/352 |
| 2007/0025547 | A1* | 2/2007 | Segal ........................ 379/399.01 |
| 2007/0064682 | A1* | 3/2007 | Adams et al. ................. 370/352 |
| 2007/0083658 | A1* | 4/2007 | Hanna et al. .................. 709/227 |
| 2007/0133524 | A1* | 6/2007 | Kwon ............................ 370/356 |
| 2007/0153770 | A1* | 7/2007 | Goyal et al. ................... 370/352 |
| 2007/0280464 | A1* | 12/2007 | Hughes et al. .......... 379/205.01 |
| 2009/0316688 | A1* | 12/2009 | Meenavalli .................... 370/352 |

OTHER PUBLICATIONS

A. B. Roach, "Session Initiation Protocol (SIP)-Specific Event Notification," *The Internet Society,*, http://www.ietf.org/rfc/rfc3265.txt, Jun. 2002, 36 pages.

J. Rosenberg et al., "An Offer/Answer Model with the Session Description Protocol (SDP)," *The Internet Society*, http://www.ietf.org/rfc/rfc3264.txt, Jun. 2002, 24 pages.

J. Rosenberg et al., "Caller Preferences for the Session Initiation Protocol (SIP)," *The Internet Society*, http://www.ietf.org/rfc/rfc3841.txt, Aug. 2004, 25 pages.

H. Schulzrinne, "Session Initiation Protocol (SIP)-H.323 Interworking Requirements," *The Internet Society*, http://www.ietf.org/rfc/rfc4123.txt.Jul. 2005, 15 pages.

J. Rosenberg et al., "SIP: Session Initiation Protocol," Standards Track, *The Internet Society*, Jun. 2002, 252 pages.

R. Mahy et al., "Remote Call Control in SIP using the REFER method and the session-oriented dialog package," Internet Draft (no longer posted on Internet), The Internet Society, 35 pages, Feb. 2004.

R. Mahy et al., "Remote Call Control in Session Initiation Protocol (SIP) using the REFER method and the session-oriented dialog package," Internet Draft, http://www.ietf.org/Internet-drafts/draft-mahy-sip-remote-cc-03.txt, The Internet Society, 14 pages, Mar. 5, 2006.

R. Mahy, et al., "The Session Initiation Protocol (SIP) 'Join' Header," The Internet Society, RFC 3991, http://www.ietf.org/rfc/rfc3911.txt, 15 pages, Oct. 2004.

R. Mahy, et al., "The Session Initiation Protocol (SIP) 'Replaces' Header," The Internet Society, RFC 3891, http://www.ietf.org/rfc/rfc3891.txt, 15 pages, Sep. 2004.

M. Soroushnejad, et al. "Implementing Bridged Line Appearances (BLA) Using Session Initiation Protocol (SIP)," Internet Draft hftp://bgp.potaroo.net/ ietf/html/ids/draft-anil-sipping-bla-03.txt, 33 pages, Jun. 15, 2006.

J. Rosenberg et al., "An Invite Initiated Dialog Event Package for the Session Initiation Protocol (SIP)," RFC 4235, http://ietfreport.isoc.org/idref/draft-ietf-sipping-dialog-package-06.txt, 38 pages, Apr. 12, 2005.

\* cited by examiner

SYSTEM AND METHOD FOR COMMUNICATING CALL INFORMATION IN A SESSIONS INITIATION PROTOCOL (SIP) ENVIRONMENT

TECHNICAL FIELD OF THE INVENTION

This invention relates in general to communications, and more particularly to a system and method for communicating call information in a session initiation protocol (SIP) environment.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies that exist in the current marketplace.

As new communication architectures (such as session initiation protocol (SIP), for example) become available to the consumer, new processes need to be developed in order to optimize this emerging technology. For example, current SIP environments are unable to provide advanced calling features to the consumer. In order to deliver a sustainable product that can compete with conventional architectures, SIP developers need a means for enabling advanced calling features.

SUMMARY OF THE INVENTION

In accordance with the present invention, the disadvantages and problems associated with providing advanced calling features in a SIP environment have been substantially reduced or eliminated.

In accordance with one embodiment of the present invention, a method is provided for invoking call features to be executed in a session initiation protocol (SIP) environment. The method comprises receiving a signal indicating a feature activation and inserting a call information header into a SIP message. The call information header comprises a parameter that identifies the activated feature.

In accordance with another embodiment of the present invention, a method is provided for controlling a user interface coupled to an endpoint in a session initiation protocol (SIP) environment. The method comprises receiving a SIP message comprising a user interface parameter carried in a call information header and modifying the user interface to reflect the value of the user interface parameter.

In accordance with another embodiment of the present invention, a method is provided for communicating user interface information to an endpoint in a session initiation protocol (SIP) environment, comprising creating a SIP message that comprises a user interface parameter in a call information header and transmitting the SIP message to the endpoint.

Important technical advantages of certain embodiments of the present invention may include invoking advanced calling features and logic without creating additional messages. Moreover, such advantages may include enabling such advanced calling features without interrupting existing call flows or processing logic.

Other important technical advantages of certain embodiments of the present invention include providing advanced feedback and state management for an end-user.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

For purposes of teaching and discussion, it is useful to provide an overview of a communication system in which certain features of the present invention may be implemented. The following foundational information may be viewed as a basis from which the present invention may be properly explained. Such information is offered earnestly for purposes of explanation only and, accordingly, should not be construed in any way to limit the broad scope of the present invention and its potential applications.

Figure 1:
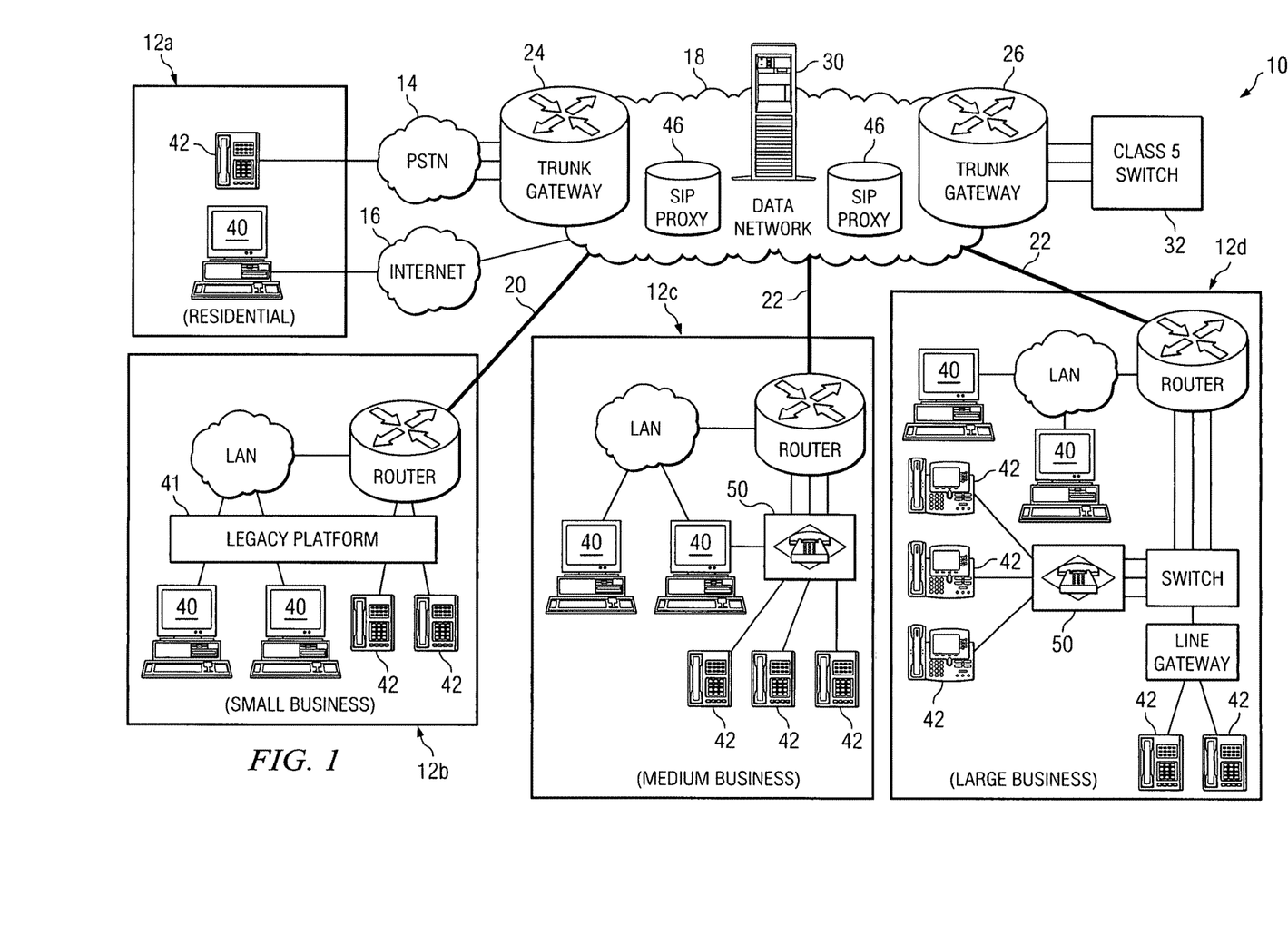
FIG. 1 is a simplified block diagram of a communication system 10 for exchanging data in a session initiation protocol (SIP) environment.

FIG. 1 is a simplified block diagram of a communication system 10 for exchanging data in accordance with certain teachings of the present invention. Communication system 10 includes domains 12a-12d, a public switched telephone network (PSTN) 14, a wide-area network 16 (such as the Internet), a data network 18, a broadband access link 20, and a number of additional links 22. Additional links 22 may include, for example, a digital subscriber line (DSL) link, a T1 link, a fiber optic link, or a wireless link. Communication system 10 also includes a set of trunk gateways 24 and 26, a third-party application server 30, a Class-5 switch 32, and may include one or more proxies 46.

Each domain may include suitable network equipment and appropriate infrastructure (e.g., switches, routers, LANs, gateways, etc.) to facilitate a communication session. Domain 12a represents a residential location, which consists of a computer 40 and a telephone 42. Telephone 42 may be an Internet protocol (IP) telephone or a standard telephone operable to interface with computer 40 such that one or more IP telephony capabilities are enabled through telephone 42. Accordingly, two types of telephones are illustrated in FIG. 1. Domain 12b represents a small business entity, which consists of a local area network (LAN), a router, several computers 40, and several telephones 42. In addition, domain 12b may include a legacy platform 41, which is operable to communicate with each telephone 42 and/or computer 40.

Domain 12c represents a medium business entity, which consists of a LAN, router, a private branch exchange (PBX) or key system, several computers 40, and several telephones 42. Domain 12d is a large business entity, which consists of a LAN, a router, a switch, a line gateway, several computers 40, and several telephones 42. Note that domains 12c and 12d each include a communications platform 50, which is operable to communicate with any number of "endpoints" (e.g., telephones 42 and/or computer 40). In one embodiment, communications platform 50 is a Call Manager element, which is manufactured by Cisco Systems, Inc. of San Jose, Calif. In other embodiments, communications platform 50 may be any suitable unit operable to interface with endpoints (e.g., telephone 42, computer 40, etc.).

Note that the term "endpoint" encompasses a myriad of potential devices and infrastructure that may benefit from the operations of communication system 10. Endpoints may represent a personal digital assistant (PDA), a cellular telephone, a standard telephone (which may be coupled to a personal computer), an IP telephone, a personal computer, a laptop computer, a mobile telephone, or any other suitable device or element (or any appropriate combination of these elements) that is operable to receive data or information. FIG. 1 illustrates only one set of example devices that may be used within communication system 10. The present invention is replete with numerous alternatives that could be used to facilitate the operations of communication system 10.

It should also be noted that the internal structure of elements within domains 12a-d are malleable and may be readily changed, modified, rearranged, or reconfigured in order to achieve intended operations. As noted above, software and/or hardware may reside in any element of domains 12a-d in order to implement certain teachings of the present invention. Specifically, such items may be included in (or loaded into) any targeted communications platform (e.g., legacy platform 41 or communication platform 50) and/or endpoint (e.g. telephones 42 and/or computers 40). This includes any usage of appropriate algorithms for executing digit analysis, identifying ambiguous patterns, recognizing overlap conditions, prompting an administrator, receiving manual inputs, etc. However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of the elements included within domains 12a-d in the context of communication system 10 and, accordingly, it should be construed as such.

In certain embodiments of the present invention, communications platform 50 may implement various IP telephony signaling protocols and functions, including the Session Initiation Protocol (SIP). Thus, for purposes of teaching and discussion, it also is useful to provide some overview of an exemplary SIP environment in which certain features of the present invention may be implemented. The following foundational information may be viewed as a basis from which the present invention may be properly explained. Such information is offered earnestly for purposes of explanation only and, accordingly, should not be construed in any way to limit the broad scope of the present invention and its potential applications.

SIP is an application-layer control protocol that can establish, modify, and terminate multimedia sessions (conferences) such as Voice over IP (VoIP) telephony calls. SIP can also invite participants to already existing sessions, such as multicast conferences. Media can be added to (and removed from) an existing session. SIP transparently supports name mapping and redirection services, which supports personal mobility. End users can maintain a single externally visible identifier regardless of their network location.

In general, SIP supports five facets of establishing and terminating multimedia communications: 1) user location (determining the end system to be used for communication); 2) user availability (determining the willingness of the called party to engage in communications); 3) user capabilities (determining the media and media parameters to be used); 4) session setup ("ringing" establishment of session parameters at both called and calling party locations); and 5) session management (including transfer and termination of sessions, modifying session parameters, and invoking services).

A standard SIP platform does not provide services. Rather, SIP provides primitives that can be used to implement different services. For example, SIP can locate a user and deliver an opaque object to his current location. If this primitive is used to deliver a session description written in SDP, for instance, the endpoints can agree on the parameters of a session. SIP can function with SOAP, HTTP, XML, SDP, and a variety of other protocols to implement services.

Endpoints in a SIP environment communicate by exchanging messages, which may be either a "request" or a "response." Generally, an endpoint (also sometimes referred to as a "user agent" or "UA") operates as either a User Agent Client (UAC) or a User Agent Server (UAS), although a single endpoint can (and often does) operate as both a UAC and a UAS. A UAC generates requests and sends them to one or more UASs. A UAS receives requests, processes them, and sends responses.

Proxy elements also play a significant role in many SIP environments. A SIP proxy (or SIP proxy server) is any intermediary element that may act as a UAC or a UAS, or both, for the purpose of exchanging messages on behalf of other user agents. Generally, the primary function of a SIP proxy server, such as SIP proxy 46 in FIG. 1, is to route messages between SIP endpoints.

A Back-to-Back user agent (B2BUA) is also an intermediary element that facilitates dialogs between SIP endpoints. A B2BUA receives requests as a UAS, but also determines how the requests should be answered by generating requests as a UAC. Unlike a proxy server, though, a B2BUA generally maintains dialog state and participates in all requests sent in dialogs that it has established.

Each SIP message (requests and responses) includes a header comprising one or more header fields. For example, many SIP headers include a "To:" header field and a "From:" header field. In turn, each header field may comprise one or more parameters that convey information about the message or, more generally, about a given session.

In accordance with teachings of the present invention, communication platform 50 provides a new SIP header field to facilitate and extend functions of SIP-enabled devices. This new header field is referred to herein as a "call information field." The parameters of the call information field vary according to the message orientation (i.e., whether the message is a request or a response).

A conventional SIP-enabled communication platform, such as communication platform 50, is capable of processing SIP requests and generating SIP responses to provide basic calling features. Such a conventional communication platform merely acts as a proxy for SIP endpoints, relaying endpoint-generated messages as needed. For example, in a scenario wherein a SIP endpoint is an IP telephone, the IP telephone may have a CALL button and a HOLD button. When a user desires to place a call from the endpoint, the user dials a number and activates the CALL button. The IP telephone then generates an appropriate SIP message (e.g., an INVITE request) and transmits the message to communication platform 50. Communication platform 50 then passes the message to another proxy or, perhaps, the destination endpoint. Similarly, if the user activates the HOLD button the IP telephone may generate a re-INVITE and transmit the re-INVITE to communication platform 50. Communication platform 50 may recognize the request as a re-INVITE and take some action based on that recognition (such as playing music), but otherwise just passes the message along to the next hop in the network.

Currently, though, SIP-enabled communication platforms are unable to provide advanced calling features because endpoint message headers do not provide sufficient information to invoke advanced calling feature processing. Advanced calling features may be particularly important to users of endpoints on a shared line. For instance, if a first user wants to transfer a call to a second user, the first user may not want a third user to be able to pick up the call on the shared line. To transfer the call, the first user might activate a TRANSFER button (or some similarly labeled button). Communication platform 50 could lock the call to prevent other users from picking up the call on the shared line, but only if it could distinguish between the activation of the TRANSFER button and other buttons.

In accordance with certain teachings of the present invention, then, an endpoint inserts a call information header into a SIP request. In one embodiment of the present invention, the call information header in a SIP request identifies the activation of a particular feature, such as when a user activates a particular feature by pressing a button or soft-key on an IP telephone. In such an embodiment, the call information header identifies the user-activated button or soft-key. For example, activated feature invocations from an endpoint could result in the sending of a call information header for a hold, hold-for-transfer, hold-for-conference, resume, barge, conference-barge, or other advanced calling features. Upon receiving the SIP request, communication platform 50 recognizes the call information header and extracts the parameters. Communication platform 50 then identifies the feature invoked by the parameter and activates the feature, such as locking the call for transfer or transmitting a data signal (audio, video, image, or the like) to an endpoint for a hold.

A communication platform also may use a call information header in a response to communicate information to an endpoint. Such information may be particularly useful for rendering a call display on the endpoint. Accordingly, in one embodiment of the present invention, a communication platform inserts one or more user interface parameters into a call information header transmitted with a SIP response. Examples of such user interface parameters include call instance, call orientation, security status, and user interface state, each of which is described in more detail below.

Some SIP-enabled devices support multiple sessions (i.e., calls) on a single line, which can be shared by more than one user. To distinguish one call from another on a single, shared line, a communication platform may number each call as it is connected to a device on a line. The number assigned to a call is referred to as the "call instance."

Figure 2:
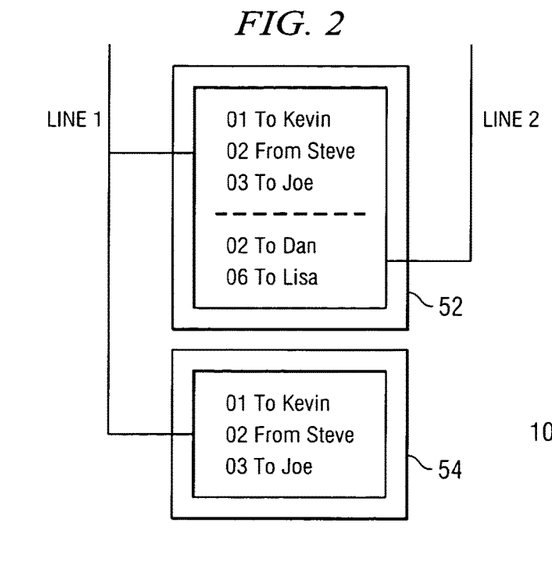
FIG. 2 is a simplified diagram that illustrates exemplary call displays on two SIP devices that implement a call instance feature of the present invention.

FIG. 2 illustrates exemplary call displays on two SIP devices that implement a call instance feature of the present invention. In the example illustrated in FIG. 2, three calls are established on shared line 1 and two calls are established on line 2. Display 52 and display 54 are coupled to devices on shared line 1. A connection on line 1 with Kevin was established first, then Steve, and finally, Joe. In accordance with teachings of the present invention, communication platform 50 assigned a call instance number to each call as the call was established. In this simplified example, the call with Kevin is identified as call instance 01, Steve as 02, and Joe as 03. Communication platform 50 communicates each call instance number in the call information header of a SIP message to an endpoint. Each endpoint may then render the call instance information on a display, such as display 52 and display 54. Because every endpoint that establishes a call on shared line 1 receives the same call information header, the call instance information rendered on each display also should be the same for that line. This call correlation feature for a shared line is illustrated in FIG. 2. Note that display 52, which also is coupled to line 2, does not share the same call instance information.

Figure 3:
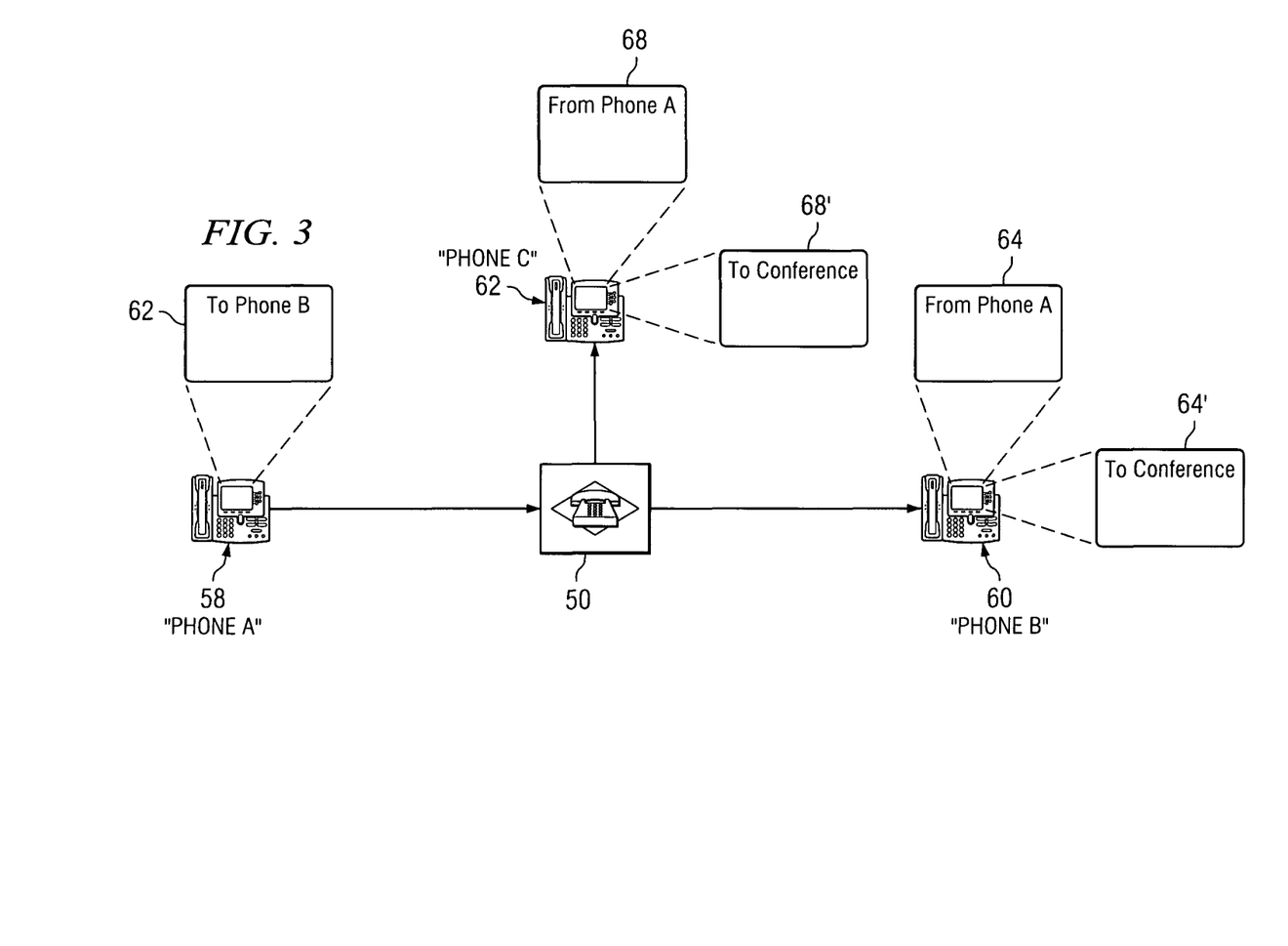
FIG. 3 is a simplified diagram that demonstrates the use of a call orientation parameter of the present invention.

FIG. 3 is a simplified diagram that demonstrates the use of a call orientation parameter of the present invention. For purposes of illustration, the following description assumes that a caller places a call from a first telephone 58 on line 1000 to a second telephone 60. Moreover, it is assumed that calls are routed through communication platform 50, that telephone 58 is identified in the SIP environment as "Phone A," and that telephone 60 is identified in the SIP environment as "Phone B." Accordingly, a display 62 coupled to telephone 58 may identify the call as "To Phone B," while a display 64 coupled to telephone 60 may identify the same call as "From Phone A." Assuming further that the caller then initiates a conference call with a third telephone 66 (identified in the SIP environment as "Phone C") on line 2, a display 68 coupled to telephone 66 may identify the conference call as "From Phone A." Note, though, that the SIP dialog between telephone 58 and telephone 60 has not changed substantially. Accordingly, display 64 may still identify the call as "From Phone A," without any indication that telephone 66 also is connected in conference. In one embodiment of the present invention, however, communication platform 50 may insert a call orientation parameter into a call information header of a SIP message to an endpoint. The endpoint, then, may use the call orientation parameter to render a more accurate description of the call on a display. Thus, in the example just described, communication platform 50 may insert a call orientation parameter that changes the call orientation for all telephones when telephone 58 connects telephone 66 in conference, so that the call orientation for all telephones is a "To" call. In one embodiment of the present invention, a telephone 60 may use the updated call orientation parameter in conjunction with other call data, such as a remote party identifier (RPID), to update display 64 and display 68. For instance, using the call orientation parameter and an RPID of "Conference", a telephone 60 may identify the call as "To Conference" or the like, as depicted in display 64' and display 68'.

Figure 4:
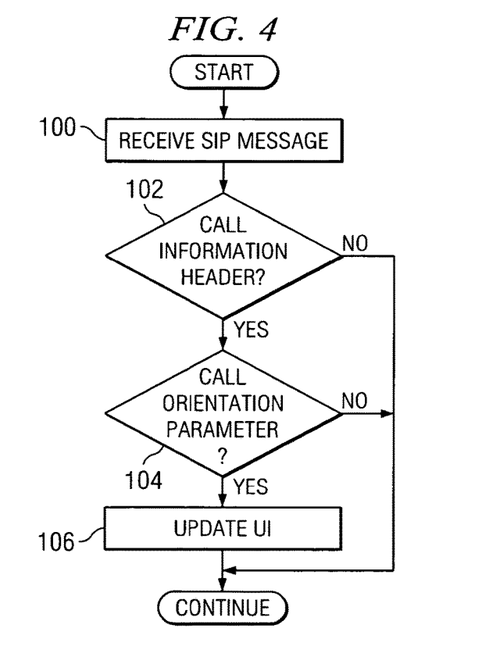
FIG. 4 is a simplified flow diagram of an example operation associated with an endpoint receiving a call orientation parameter.

FIG. 4 is a simplified flow diagram of an example operation associated with an endpoint receiving a call orientation parameter. At step 100, the endpoint receives a SIP message. Then, at step 102, the endpoint determines if the SIP message includes a call information header. If the SIP message does not include a call information header, the endpoint processes the message as a standard SIP message. Otherwise, the endpoint determines if the call information header includes a call orientation parameter (step 104). If the call information header includes a call orientation parameter, the endpoint updates the UI to reflect the orientation described by the parameter (step 106).

Figure 5:
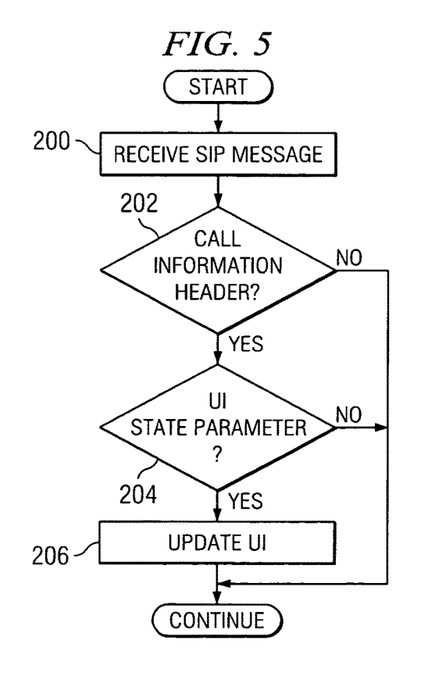
FIG. 5 is a simplified flow diagram of an example operation associated with an endpoint receiving a user interface (UI) state parameter.

FIG. 5 is a simplified flow diagram of an example operation associated with an endpoint receiving a user interface (UI) state parameter. For purposes of teaching, the following description again assumes that a caller places a call from a first telephone 58 on line 1000 to a second telephone 60. Moreover, it is assumed that calls are routed through communication platform 50, which provides B2BUA services to endpoints in its domain. In this example, telephone 58 is identified in the SIP environment as "Phone A," and telephone 60 is identified in the SIP environment as "Phone B." Here, though, the caller initiates a transfer to telephone 66 (rather than a conference call, as described above with reference to FIG. 3). Also for purposes of teaching, it is important to understand that certain calling features depend on the state of an endpoint at any given time. Many endpoints associate calling features with soft-keys, which are displayed to a user only if the endpoint has a certain state. For example, if an endpoint is in a "connected" state, an endpoint may display soft-keys associated with a hold or a transfer calling feature. But a conventional endpoint has no way to distinguish between a "connected" state and a "transfer" state in early stages of the transfer facilitated by a B2BUA, although the features that should be available are quite different. For instance, if an endpoint is attempting to connect to another endpoint to facilitate a transfer, a user should not be able to put the call on hold. Thus, the hold feature should be disabled while telephone 60 is "ringing out" to telephone 66 for a transfer. Moreover, telephone 60 should be ringing in such a state, which is not a normal feature of a "connected" state. To substantially eliminate or greatly reduce this disadvantage of a conventional SIP endpoint operating in conjunction with certain B2BUA platforms, one feature of the present invention enables communication platform 50 to insert a UI state parameter into a call information header of a SIP message to an endpoint. Upon receiving a UI state parameter, an endpoint may update the calling features available through soft-keys and other displays according to the value of the UI state parameter.

Referring again to FIG. 5 for illustration, an endpoint receives a SIP message at step 200. Then, at step 202, the endpoint determines if the SIP message includes a call information header. If the SIP message does not include a call information header, the endpoint processes the message as a standard SIP message. Otherwise, the endpoint determines if the call information header includes a UI state parameter (step 204). If the call information header includes a UI state parameter, the endpoint updates the UI to reflect the state described by the parameter (step 206).

In accordance with another embodiment of the present invention, communication platform 50 also may insert a security status parameter into a call information header of a SIP message to an endpoint. A security status parameter generally indicates whether a call has security associated with it, whether it is secure signaling, secure media, neither, or both. An endpoint may associate each security status with a particular security icon (such as a lock or a shield) and render the appropriate icon on a display when the endpoint receives a SIP message with a security status parameter.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method, comprising:
during a first call session, receiving, by a communication platform managing a plurality of call sessions between a plurality of endpoints on a first shared line, a first session initiation protocol (SIP) message comprising a first call information header indicating activation of a call feature for the first call session for a first endpoint associated with a first user of a shared line, the first call session sharing the shared line with a second call session for a second endpoint associated with a second user, the second call session distinct from the first call session, wherein the first endpoint is not participating in the second call session and the second endpoint is not participating in the first call session, and wherein the activation of the call feature requests a hold-for-transfer of the first call session to a third endpoint associated with a third user;
based on the first call information header indicating the activation of the call feature, processing, by the communication platform, the first SIP message indicating call feature activation to distinguish between the request for the hold-for-transfer of the first call session from a plurality of other call features;
locking, by the communication platform, the first call session to prevent the second user of the second endpoint on the shared line from picking up the first call session while the first call session is transferred, at the request of the first user, to the third endpoint associated with the third user;
creating a second SIP message for transmission to the first endpoint and the second endpoint;
inserting, by the communication platform, a second call information header with a plurality of parameters identifying the activated call feature, the first call session, and the second call session into the second SIP message for rendering the activated call feature requesting the hold-for transfer on a respective display of the first endpoint and the second endpoint; and
sending the second call information header packaged in the second SIP message over the shared line to the first endpoint and the second endpoint.

2. The method of claim 1, further comprising:
inserting a plurality of user interface parameters identifying the first call session and the second call session into the second call information header of the second SIP message for transmission to the first endpoint and the second endpoint, wherein a first user interface parameter is associated with the activation of the call feature requesting the hold-for-transfer of the first call session to the third endpoint associated with the third user.

3. The method of claim 2, wherein a second user interface parameter is a call instance parameter that correlates the first call session on a shared line.

4. The method of claim 2, wherein a second user interface parameter is a call orientation parameter for rendering on the respective display of the first endpoint and the second endpoint the orientation of a call as a "To" call or a "From" call with respect to the first or the second endpoint.

5. The method of claim 2, wherein a second user interface parameter is a user interface state parameter that identifies a state of a respective user interface coupled to the first or second endpoint.

6. The method of claim 2, wherein a second user interface parameter is a security status parameter for rendering an icon on the first endpoint and the second endpoint that indicates that the first call session has security associated with the first call session.

7. The method of claim 1, wherein a first parameter of the plurality of parameters is associated with the activated call feature, the first parameter comprising information identifying a user-activated button associated with the call feature activated by the first user of the first endpoint.

8. The method of claim 2, wherein the first user interface parameter associated with the activation of the call feature comprises information identifying a user-activated button associated with the call feature activated by the first user of the first endpoint.

9. A method comprising:
receiving, by a communication platform managing a plurality of call sessions between a plurality of endpoints on a first shared line, a first session initiation protocol (SIP) message for a first call session for a first endpoint associated with a first user of a shared line, the first call session sharing the shared line with a second call session for a second endpoint associated with a second user, the second call session distinct from the first call session, wherein the first endpoint is not participating in the second call session and the second endpoint is not participating in the first call session;
extracting, by the communication platform, a plurality of user interface parameters identifying the first call session and the second call session from a first call information header of the first SIP message;
based on a first user interface parameter in the first call information header of the first SIP message, distinguishing between a request for a call feature comprising a hold-for-transfer of the first call session by the first endpoint for transfer of the first call session to a third point associated with a third user from a plurality of other call features;
locking, by the communication platform, the first call session to prevent the second user of the second endpoint on the shared line from picking up the first call session while the first call session is transferred, at the request of the first user, to the third endpoint associated with the third user;
creating a second SIP message for transmission to the first endpoint and the second endpoint;
inserting, by the communication platform, a second call information header with a plurality of parameters identifying the call feature, the first call session, and the second call session into the second SIP message for rendering the call feature requesting the hold-for-transfer on a respective display of the first endpoint and the second endpoint; and
sending the second call information header packaged in the second SIP message over the shared line to the first endpoint and the second endpoint to modify a first user interface at the first endpoint and a second user interface at the second endpoint to reflect an activation of the call feature requesting the hold-for-transfer of the first call session to the third endpoint associated with the third user.

10. The method of claim 9, wherein a second user interface parameter is a call instance parameter that correlates the first call session on a shared line.

11. The method of claim 10, wherein the call instance parameter assigns a unique value to the first call session, and wherein the modification of the user interface comprises displaying the unique value assigned to the first call session.

12. The method of claim 9, wherein a second user interface parameter is a call orientation parameter for rendering on the respective display of the first endpoint and the second endpoint the orientation of a call as a "To" call or a "From" call with respect to the first or the second endpoint.

13. The method of claim 9, wherein a second user interface parameter is a user interface state parameter that identifies a state of a respective user interface coupled to the first or second endpoint.

14. The method of claim 13, wherein the modification of the user interface comprises displaying a set of soft keys associated with the state.

15. The method of claim 9, wherein a second user interface parameter is a security status parameter for rendering on the first endpoint and the second endpoint a security state associated with the first call session.

16. The method of claim 15, wherein the modification of the user interface comprises displaying a security icon associated with the security state.

17. A first endpoint apparatus, comprising:
a user interface component;
a processing component operable to:
establish a first call session for the first endpoint apparatus on a shared line that is also in use by a second endpoint apparatus maintaining a second call session on the shared line, the second call session distinct from the first call session, wherein the first endpoint apparatus is not participating in the second call session and the second endpoint apparatus is not participating in the first call session;
receive a session initiation protocol (SIP) message associated with the second call session by the second endpoint apparatus;
determine if the SIP message comprises a first call information header;
determine if the first call information header carries a plurality of user interface parameters identifying the first call session and the second call session;
based on a first user interface parameter, identifying the activation of a call feature requesting a hold-for transfer by the second user apparatus of the second call session to a third endpoint apparatus associated with a third user;
lock the first call session on the shared line to prevent the first user of the first endpoint apparatus from picking up the second call session while the second call session is transferred, at the request of the second user, to the third endpoint apparatus;
receive, by the first endpoint, a second SIP message sent over the shared line to the first endpoint and the second endpoint, the second SIP message comprising a second call information header with a plurality of parameters identifying the call feature, the first call session, and the second call session; and
in response to receiving the second SIP message comprising the second call information header, modify the user interface component of the first endpoint apparatus to reflect the activation of the call feature requesting the transfer of the second call session to the third endpoint associated with the third user.

18. The first endpoint apparatus of claim 17, wherein a second user interface parameter is a call instance parameter that correlates the first call session on the shared line.

19. The first endpoint apparatus of claim 18, wherein:
the call instance parameter assigns a unique value to the first call session; and
the modification of the user interface component of the first endpoint apparatus comprises displaying the unique value assigned to the first call session of the second endpoint apparatus.

20. The first endpoint apparatus of claim 19, wherein
the second user interface parameter is a call orientation parameter for rendering on the respective user interface component of the first endpoint the orientation of the second call session as a "To" call or a "From" call with respect to the first endpoint apparatus.

21. The first endpoint apparatus of claim 20, wherein the second user interface parameter is a user interface state parameter that identifies the state of the user interface component.

22. The endpoint apparatus of claim 21, wherein the modification of the user interface component comprises displaying a set of soft keys associated with the state.

23. The first endpoint apparatus of claim 17, wherein the second user interface parameter is a security status parameter for rendering on the first endpoint a security state associated with the first call session.

24. The first endpoint apparatus of claim 23, wherein the modification of the user interface component comprises displaying a security icon associated with the security state.

25. A communication platform, comprising:
a processing component operable to:
during a first call session, receive a first session initiation protocol (SIP) message comprising a first call information header indicating activation of a call feature for the first call session for a first endpoint associated with a first user of a shared line, the first call session sharing the shared line with a second call session for a second endpoint associated with a second user, the second call session distinct from the first call session, the session initiation protocol message for transmission to the first endpoint and the second endpoint, wherein the first endpoint is not participating in the second call session and the second endpoint is not participating in the first call session, and wherein the activation of the call feature requests a hold-for-transfer of the first call session to a third endpoint associated with a third user;
based on the first call information header indicating the activation of the call feature, process the first SIP message to distinguish between the request for the activation of the call feature for the hold-for-transfer of the first call session from a plurality of other call features;
lock the first call session to prevent the second user of the second endpoint on the shared line from picking up the first call session while the first call session is transferred, at the request of the first user, to the third endpoint associated with the third user;
create a second SIP message for transmission to the first endpoint and the second endpoint;
insert, by the communication platform, a second call information header with a plurality of parameters identifying the activated call feature, the first call session, and the second call session into the second SIP message for rendering the activated call feature requesting the hold-for transfer on a respective display of the first endpoint and the second endpoint; and
a messaging component operable to transmit the second call information header packaged in the second SIP message over the shared line to a the first endpoint and the second endpoint.

26. The communication platform of claim 25, wherein the plurality of parameters comprise a call instance parameter that correlates the first call session on a shared line.

27. The communication platform of claim 25, wherein the plurality of parameters comprise a call orientation parameter for rendering on the respective display of the first endpoint and the second endpoint the orientation of a call as a "To" call or a "From" call with respect to the first or the second endpoint.

28. The communication platform of claim 25, wherein the plurality of parameters comprise a user interface state parameter that identifies a state of a respective user interface coupled to the first or second endpoint.

29. The communication platform of claim 25, wherein the plurality of parameters comprise a security status parameter a security status parameter for rendering on the first endpoint and the second endpoint a security state associated with the first call session.

30. Software embodied in a non-transitory computer-readable storage medium comprising computer code such that when executed is operable to:
during a first call session, receive, by a communication platform managing a plurality of call sessions between a plurality of endpoints on a first shared line, a first session initiation protocol (SIP) message comprising a first call information header indicating activation of a call feature for the first call session for a first endpoint associated with a first user of a shared line, the first call session sharing the shared line with a second call session for a second endpoint associated with a second user, the second call session distinct from the first call session, wherein the first endpoint is not participating in the second call session and the second endpoint is not participating in the first call session, and wherein the activation of the call feature requests a hold-for-transfer of the first call session to a third endpoint associated with a third user;
based on the first call information header indicating the activation of the call feature, process the first SIP message to distinguish between the request for the activation of the call feature for the hold-for-transfer of the first call session from a plurality of other call features;
lock, by the communication platform, the first call session to prevent the second user of the second endpoint on the shared line from picking up the first call session while the first call session is transferred, at the request of the first user, to the third endpoint associated with the third user;
create a second SIP message for transmission to the first endpoint and the second endpoint;
insert, by the communication platform, a second call information header with a plurality of parameters identifying the activated call feature, the first call session, and the second call session into the second SIP message for rendering the activated call feature requesting the hold-for transfer on a respective display of the first endpoint and the second endpoint; and send the second call information header packaged in the second SIP message over the shared line to the first endpoint and the second endpoint.

31. Software embodied in a non-transitory computer-readable storage medium comprising computer code such that when executed is operable to:

receive a first session initiation protocol (SIP) message for a first call session for a first endpoint associated with a first user of a shared line, the first call session sharing the shared line with a second call session for a second endpoint associated with a second user, the second call instance distinct from the first call session, wherein the first endpoint is not participating in the second call session and the second endpoint is not participating in the first call session;

extract a plurality of user interface parameters identifying the first call session and the second call session from a first call information header of the first SIP message;

based on a first user interface parameter in the first call information header of the first SIP message, distinguish between a request for a call feature comprising a hold-for-transfer of the first call session by the first endpoint for transfer of the first call session to a third point associated with a third user from a plurality of other call features;

lock the first call session to prevent the second user of the second endpoint on the shared line from picking up the first call session while the first call session is transferred, at the request of the first user, to the third endpoint associated with the third user;

create a second SIP message for transmission to the first endpoint and the second endpoint;

insert, by the communication platform, a second call information header with a plurality of parameters identifying the call feature, the first call session, and the second call session into the second SIP message for rendering the call feature requesting the hold-for-transfer on a respective display of the first endpoint and the second endpoint; and sending the second call information header packaged in the second SIP message over the shared line to the first endpoint and the second endpoint to modify a first user interface at the first endpoint and a second user interface at the second endpoint to reflect an activation of the call feature requesting the hold-for-transfer of the first call session to the third endpoint associated with the third user.

* * * * *